(12) United States Patent
Kitahara et al.

(10) Patent No.: US 11,914,755 B2
(45) Date of Patent: Feb. 27, 2024

(54) CLUSTER RESOURCE SIGNATURE VERIFICATION

(71) Applicant: INTERNATIONAL BUSINESS MACHINES CORPORATION, Armonk, NY (US)

(72) Inventors: Hirokuni Kitahara, Sumida-ku (JP); Ruriko Kudo, Saitama (JP); Kugamoorthy Gajananan, Toshima-ku (JP); Yuji Watanabe, Chuouku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 468 days.

(21) Appl. No.: 17/167,398

(22) Filed: Feb. 4, 2021

(65) Prior Publication Data
US 2022/0245285 A1   Aug. 4, 2022

(51) Int. Cl.
*G06F 21/64* (2013.01)
*G06F 9/50* (2006.01)
*G06F 11/34* (2006.01)
*G06F 21/31* (2013.01)

(52) U.S. Cl.
CPC ............ *G06F 21/64* (2013.01); *G06F 9/5011* (2013.01); *G06F 11/3457* (2013.01); *G06F 21/31* (2013.01)

(58) Field of Classification Search
CPC ........ G06F 21/64; G06F 21/31; G06F 21/566; G06F 21/563
See application file for complete search history.

(56) References Cited

U.S. PATENT DOCUMENTS

| | | | |
|---|---|---|---|
| 6,263,434 B1 | 7/2001 | Hanna et al. | |
| 7,840,814 B2* | 11/2010 | Benoit | G07F 7/1008 |
| | | | 455/410 |
| 9,268,935 B2* | 2/2016 | Lindo | H04W 12/37 |

(Continued)

FOREIGN PATENT DOCUMENTS

| | | |
|---|---|---|
| CN | 106066812 A | 11/2016 |
| CN | 108777625 A | 11/2018 |

(Continued)

OTHER PUBLICATIONS

R. Kudo, H. Kitahara, K. Gajananan and Y. Watanabe, "Integrity Protection for Kubernetes Resource Based on Digital Signature," 2021 IEEE 14th International Conference on Cloud Computing (CLOUD), Chicago, IL, USA, 2021, pp. 288-296. (Year: 2021).*

(Continued)

*Primary Examiner* — Kari L Schmidt
(74) *Attorney, Agent, or Firm* — Tutunjian & Bitetto, P.C.; Robert Richard Aragona

(57) ABSTRACT

Methods and systems for verifying a resource definition include simulating an original resource definition to identify at least one change that is made to the original resource definition by a management service. A signature of a received resource definition is generated, omitting portions of the received resource definition that correspond to the at least one identified change. The signature of the received resource definition is compared to a signature of the original resource definition to find a match and to verify the received resource definition. The received resource definition is implemented, responsive to finding the match.

14 Claims, 8 Drawing Sheets

(56) References Cited

U.S. PATENT DOCUMENTS

| | | | |
|---|---|---|---|
| 9,442,810 B2* | 9/2016 | Jaisinghani | H04L 41/12 |
| 9,501,313 B2 | 11/2016 | Konik et al. | |
| 9,665,385 B1* | 5/2017 | Nguyen | G06F 9/455 |
| 9,679,122 B1 | 6/2017 | Dehaan et al. | |
| 10,291,706 B1* | 5/2019 | Zhao | H04L 67/1097 |
| 10,404,474 B1* | 9/2019 | Caceres | G06F 9/455 |
| 10,742,421 B1* | 8/2020 | Wentz | H04L 9/0897 |
| 10,824,726 B1* | 11/2020 | Herman Saffar | G06F 21/566 |
| 11,593,495 B2* | 2/2023 | Dekel | G06F 21/6209 |
| 2004/0193388 A1* | 9/2004 | Outhred | H04L 67/1001 |
| | | | 703/1 |
| 2014/0006796 A1* | 1/2014 | Smith | G06F 21/645 |
| | | | 713/187 |
| 2018/0129479 A1* | 5/2018 | McPherson | G06F 8/63 |
| 2018/0367528 A1 | 12/2018 | Schwarz et al. | |
| 2019/0065323 A1 | 2/2019 | Dhamdhere et al. | |
| 2020/0067789 A1* | 2/2020 | Khuti | H04L 41/5009 |
| 2020/0228402 A1* | 7/2020 | Parker | G06F 9/45533 |
| 2020/0389372 A1 | 12/2020 | Tian | |
| 2021/0144013 A1* | 5/2021 | Chen | H04L 9/0894 |
| 2021/0311763 A1* | 10/2021 | Beard | G06F 8/65 |
| 2022/0019418 A1* | 1/2022 | McKay | H04L 63/20 |
| 2022/0114003 A1* | 4/2022 | Okman | G06F 9/45558 |
| 2022/0237048 A1* | 7/2022 | Wiggers | G06F 9/5027 |

FOREIGN PATENT DOCUMENTS

| | | |
|---|---|---|
| CN | 111144859 A | 5/2020 |
| WO | 2018205325 A1 | 11/2018 |

OTHER PUBLICATIONS

Moritz Strube, et al. DrySim: simulation-aided deployment-specific tailoring of mote-class WSN software. In Proceedings of the 17th ACM international conference on Modeling, analysis and simulation of wireless and mobile systems (MSWiM '14). Association for Computing Machinery, New York, NY, 3-11. (Year: 2014).*

International Search Report and Written Opinion issued in corresponding PCT Application Serial No. PCT/ CN2022/071600, dated Mar. 17, 2022, pp. 1-8.

Anonymous., "Certificate Signing Requests", Kubernetes v1.19 [stable], pp. 1-9, Oct. 20, 2020.

Anonymous., "Extend the Kubernetes API with CustomResourceDefinitions", Kubernetes v1.10 [beta], pp. 1-19, Nov. 4, 2020.

Mell et al., "The NIST Definition of Cloud Computing", National Institute of Standards and Technology, Special Publication 800-145, Sep. 2011, pp. 1-7.

* cited by examiner

CLUSTER RESOURCE SIGNATURE VERIFICATION

BACKGROUND

The present invention generally relates to cluster management and security, and, more particularly, to signing static parts of a resource definition.

Cloud computing systems now run a wide variety of mission-critical applications, including financial and governmental institutions. Such systems may be implemented in a variety of ways, including any of several container orchestration systems. The sensitive nature of such applications brings with it a need for strong security, for example to prevent resources from being tampered with prior to implementation.

SUMMARY

A method for verifying a resource definition includes simulating an original resource definition to identify at least one change that is made to the original resource definition by a management service. A signature of a received resource definition is generated, omitting portions of the received resource definition that correspond to the at least one identified change. The signature of the received resource definition is compared to a signature of the original resource definition to find a match and to verify the received resource definition. The received resource definition is implemented, responsive to finding the match.

A system for verifying a resource definition includes a hardware processor and a memory that stores computer program code. When the computer program code is executed by the hardware processor, it causes the hardware processor to simulate an original resource definition to identify at least one change that is made to the original resource definition by a management service, to generate a signature of a received resource definition, omitting portions of the received resource definition that correspond to the at least one identified change, to compare the signature of the received resource definition to a signature of the original resource definition to find a match and to verify the received resource definition, and to implement the received resource definition, responsive to finding the match.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

A given cluster resource may change during use. For example, an original resource may be different from the resource that is actually implemented. This presents a challenge, when an application requires that the resource be digitally signed before installation. In such a case, the installation may fail, because the signed resource is not identical to the resource that is being installed.

To address this problem, a resource whitelist may be generated to identify the parts of the resource that will not change. This may be accomplished by simulating the resource multiple times to identify those attributes within the resource that remain constant, and those which change. A signature file can then be generated that is based on the static portions of the resource. At the time of installation, the signature can be verified by looking only to those attributes within the resource that are static.

Figure 1:
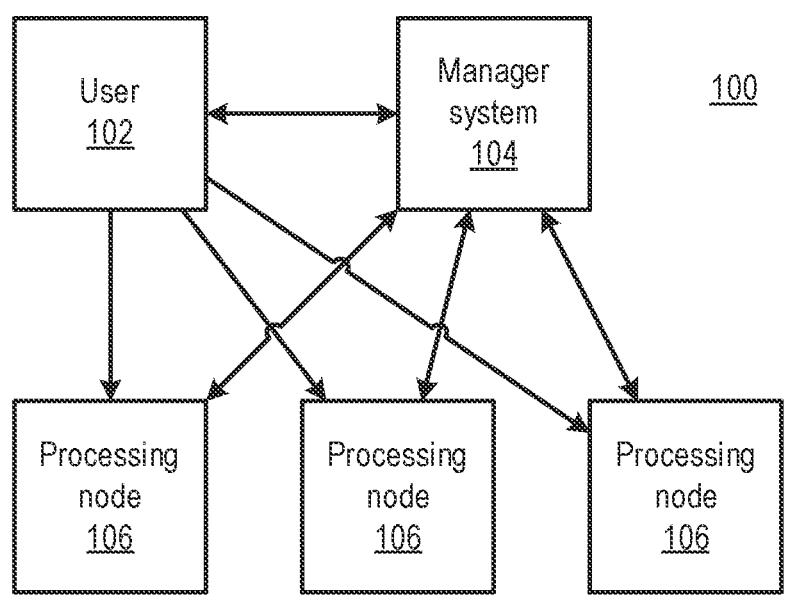
FIG. 1 is a block diagram of a Platform as a Service (PaaS) system that includes resource signature verification, in accordance with an embodiment of the present invention.

Referring now to FIG. 1, a diagram of a platform as a system (PaaS) system 100 is shown. A user 102 has a workload for execution on a distribution computing platform. The user 102 communicates with a manager system 104 and provides information regarding the workload, including the number and type of processing nodes 106 that will be needed to execute the workload. The information provided to the manager system 104 includes, for example, a number of processing nodes 106, a processor type, an operating system, an execution environment, storage capacity, random access memory capacity, network bandwidth, and any other points that may be needed for the workload. The user 102 can furthermore provide particular images or containers to the manager system 104 for storage in a registry there. It should be understood that the PaaS system 100 can include many thousands of processing nodes 106, each of which can be idle or busy in accordance with the workloads being executed by the PaaS system 100 at any given time. It should also be understood that, although a single manager system 104 is shown, there can be multiple such manager systems 104, with multiple registries distributed across the PaaS system 100. While this can reduce the problem of limited bandwidth at the registry by providing alternative image sources, very large deployments will still cause delays. Furthermore, although the manger system 104 is shown as being a single device, it should be understood that scheduling can be performed at a separate location from the image registry.

Before and during execution of the workload, the manager system 104 determines which processing nodes 106 will use which images. The manager system 104 thus distributes images to the processing nodes 106 according to its own internal logic, for example based on node and resource availability at the time of provisioning. The manager system 104 and the PaaS system 100 can handle multiple different workloads from multiple different users 102, such that the availability of particular resources will depend on what is happening in the PaaS system 100 generally.

Provisioning, as the term is used herein, refers to the process by which resources in a PaaS system 100 are allocated to a user 102 and are prepared for execution. Thus, provisioning includes the determinations made by the manager system 104 as to which processing elements 106 will be used for the workload as well as the transmission of images and any configuration steps that are needed to prepare the processing nodes 106 for execution of the workload. The processing nodes 106 selected by the manager system 104 then install the images and perform any configuration needed for the workload. Execution can then proceed, triggered by the manager system 104, by the user 102, or by any other appropriate source.

It is to be understood in advance that, although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Figure 2:
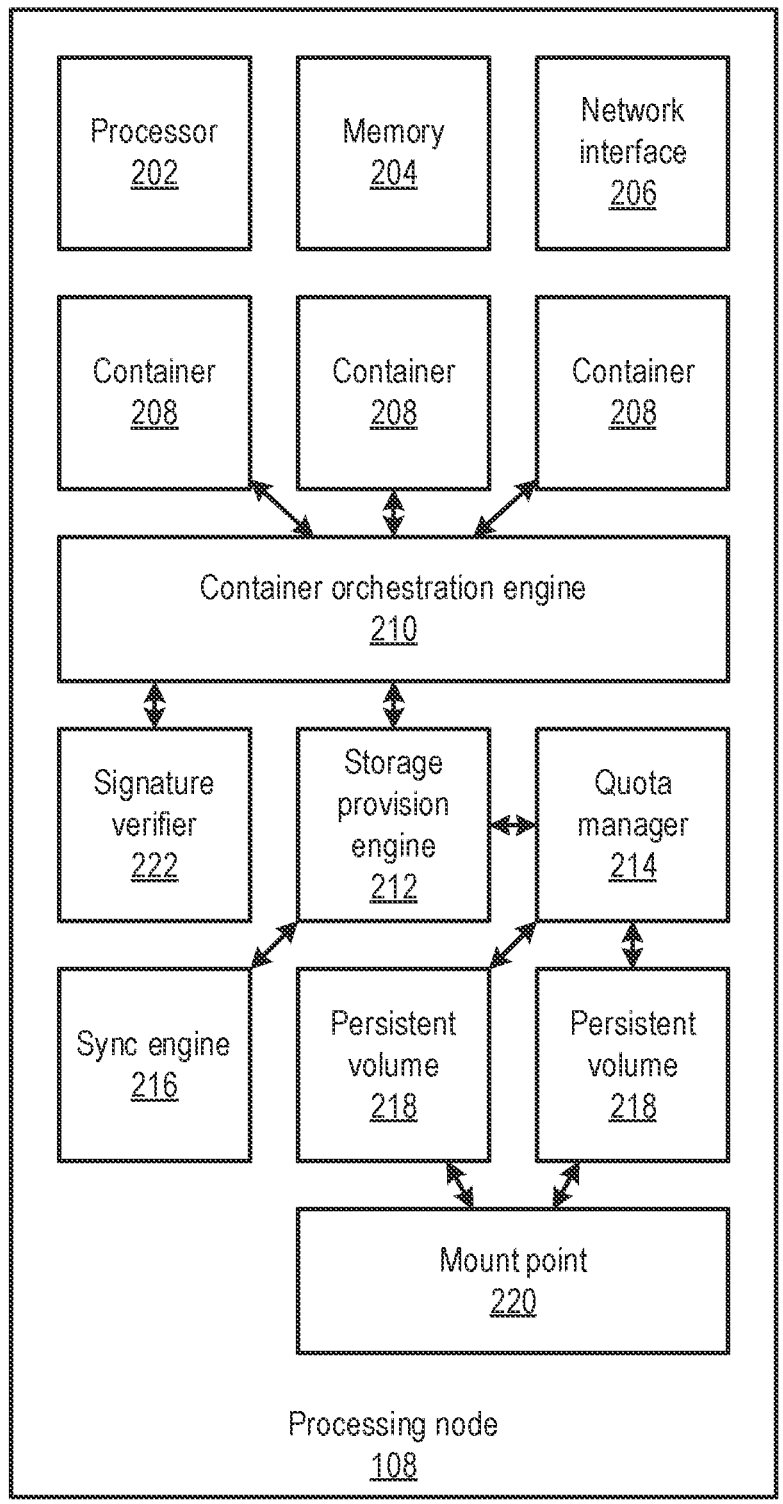
FIG. 2 is a block diagram of an individual processing node in a PaaS system that performs signature verification on received resource definitions, in accordance with an embodiment of the present invention.

Referring now to FIG. 2, additional detail on a processing node 106 is shown. The processing node 106 includes a hardware processor 202, a memory 204, and a network interface 206. The network interface 206 is configured to communicate with the manager system 104 and with other processing nodes 106 as needed, using any appropriate wired or wireless communications medium and protocol. The processing node 106 also includes one or more functional modules that may, in some embodiments, be implemented as software that is stored in the memory 204 and that is executed by the hardware processor 202. In other embodiments, one or more of the functional modules may be implemented as one or more discrete hardware components in the form of, e.g., application-specific integrated chips or field programmable gate arrays.

The processing node 106 may include one or more containers 208, for example that have been distributed to it by the manager system 104. It is specifically contemplated that each container 208 represents a distinct operating environment. The containers 208 each include a set of software applications, configuration files, workload datasets, and any other information or software needed to execute a specific workload. The containers 208 are stored in memory 204 and are instantiated and decommissioned by the container orchestration engine 210 as needed. It should be understood that, as a general matter, an operating system of the processing node 106 exists outside the containers 208. Thus, each container 208 interfaces with the same operating system kernel, reducing the overhead needed to execute multiple containers simultaneously. The containers 208 meanwhile generally have no communication with one another outside of specifically agreed-to interfaces, reducing security concerns.

A container 208 may access a distributed filesystem that is shared between multiple processing nodes 106. The container 208 may communicate with the container orchestration engine 210 to mount a persistent volume 218. Upon receipt of a request from a container 208, the container orchestration engine 210 communicates with the storage provision engine 212. When the storage provision engine 212 receives a directory request, it provisions the distributed filesystem with a local directory mount point, informs the quota manager 214 and sync engine 216 to complete quota/isolation and information syncing processes, and provides a directory back to the container orchestration engine 210.

The quota manager 214 interacts with the storage provision engine 202 to set quotas and isolation for the persistent volume directories 218. The quota manager 214 gets information from the storage provision engine 212 regarding the successful mount of the distributed filesystem and can be implemented as, for example, a kernel module, where system calls monitor the directory size and isolation of the persistent volumes 218. The quota manager 214 interacts with the storage provision engine 212 to address volumes overrunning their quotas. For example, the quota manager 214 can perform actions based on policy, such as halting writing operations, when the directory's size exceeds a predetermined quota. The quota amount for an individual directory is determined when the persistent volume 218 is created. Isolation is used to ensure that the persistent volume 218 cannot be used by other processes.

A sync engine 216 communicates with sync engines 216 from other processing nodes 106. The sync engine 216 communicates information relating to how the persistent volumes 218 are being used, including quota information and isolation information. Quota and isolation is set on a per-host basis, so the sync engine 216 communicates that information to other hosts to guarantee consistence across different nodes.

The persistent volumes 218 are represented herein as directories in the local filesystem of the processing node 106. These directories can then be mount points 220 for the distributed filesystem 106. As the containers 208 access the persistent volumes 218, filesystem operations are transmitted to and from the distributed filesystem 106, making the data in the distributed filesystem 106 accessible to the containers. In particular, it should be noted that multiple containers 208 can share access to the distributed filesystem in this manner.

In some cases, where signature verification is needed before a resource can be installed, the container orchestration engine 210 communicates with a signature verifier 222. The signature verifier compares the resource that is to be installed (e.g., a description of a container 208) with a signature for the resource. If the signature matches, then the resource may be installed and executed. If not, then the signature verifier 222 denies the request, and the resource is prevented from being installed or executed.

Figure 3:
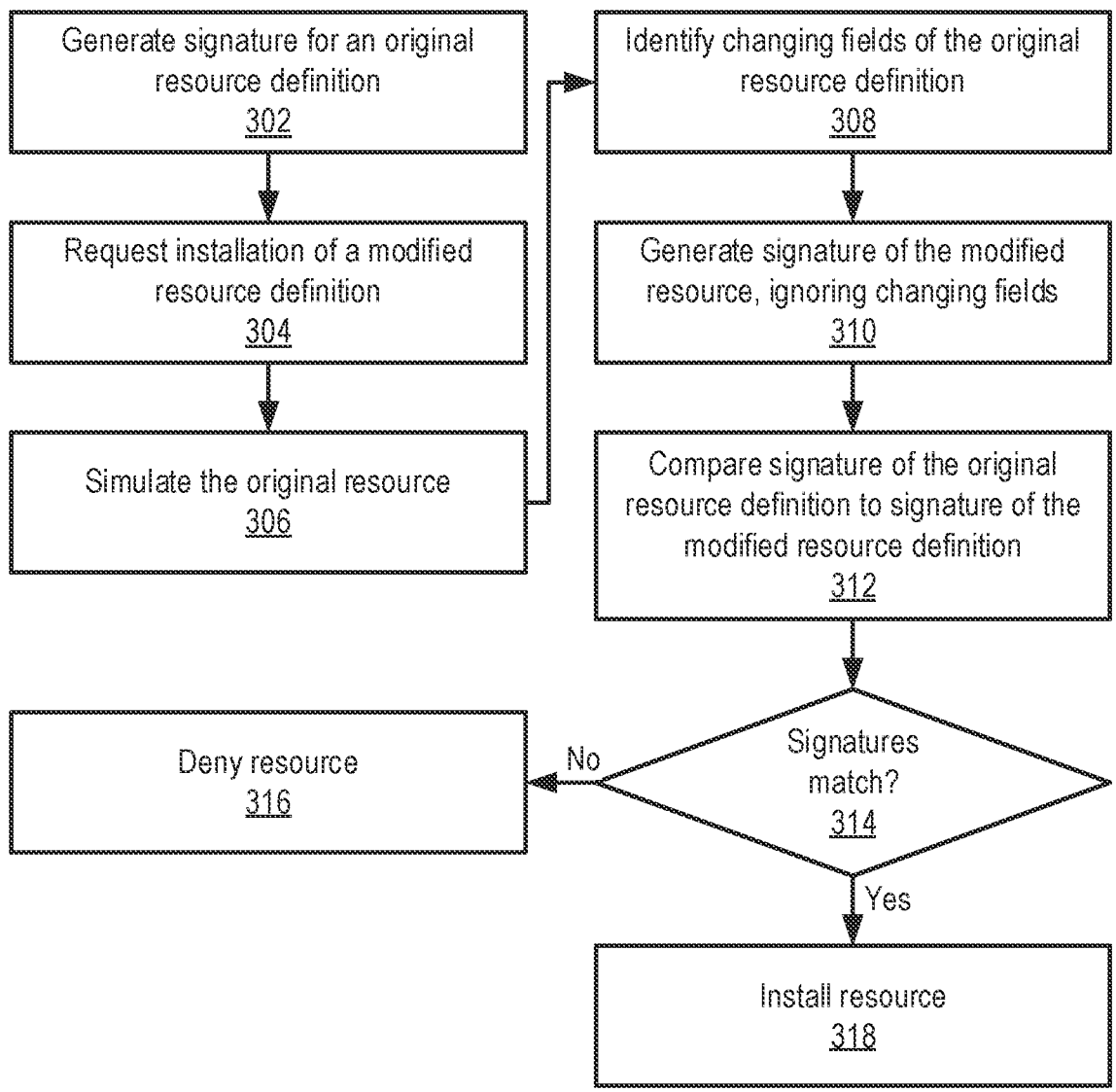
FIG. 3 is a block/flow diagram of a method for verifying a received resource definition against a signature of a corresponding original resource definition, in accordance with an embodiment of the present invention.

Referring now to FIG. 3, a method for verifying a resource definition is shown. Block 302 generates a signature for an original resource definition. In one specific, and non-limiting example, a KUBERNETES® system may be used for container management. In such an embodiment, resources may be defined using text-based files in the "YAML" format. The following is an exemplary YAML resource definition that may be used in a KUBERNETES system:

```
abiVersion: v1
kind: ConfigMap
data:
```

-continued

```
sample-data: abc
Security-enabled: true
```

It should be understood that this resource definition is purely exemplary, and that any appropriate resource may be used instead. The signature may be generated by any appropriate signing algorithm, for example using a signing key. Such algorithms may include, for example, RSA, DSA, and ECDSA. Additionally, the use of other container management systems is also contemplated.

Block 304 receives a request for installing the resource, for example using a resource definition file that has been modified by a KUBERNETES system. For example, the modified resource definition may be changed as follows, with differences being indicated:

```
abiVersion: v1
kind: ConfigMap
metadata:                          # This line has been added
    uid: a2b4e4f2-3ca8-a996        # This line has been added
data:
    sample-data: abc
    Security-enabled: true
    default-config: def            # This line has been added
```

If a signature was formed for the original resource definition, and the signature verifier 222 later attempts to verify the signature for the entirety of the modified resource definition, then the verification will fail, because the modified resource definition is not identical. To address this problem, the signature verifier 222 ignores those lines of the modified resource definition which are expected to be altered by the system. Excluding such lines, the signature verifier 222 generates a signature of the remaining lines and compares it to the signature of the original resource definition. If there is a match, then the modified resource definition may be verified.

While these changeable lines and fields may be predetermined by analysis of the KUBERNETES system software, software updates may cause changes to how the resource definitions are handled, and may add new types of information that were not previously contemplated. To address this, the changes may be analyzed on a per-resource basis, at runtime, to build a whitelist of current changes.

Thus, block 306 may simulate the original resource definition, for example using the KUBERNETES "DryRun" function, to generate one or more simulated resource definitions, which may be changed in a manner that is similar to the changes that would be made by the KUBERNETES system for an actual implementation. By simulating the resource, rather than relying on a static whitelist, changes to the underlying software can be accommodated immediately. By comparing the simulated resource definitions to the original resource definitions, block 308 can find lines that have been altered in, or added to, the simulated resource definitions. At least two simulations may be run, but greater numbers may provide better results.

Block 310 generates a signature for the modified resource definition, ignoring any lines that have were indicated in block 308 as being changed. Block 312 compares the signature of the original resource definition to the signature of the modified resource definition. If block 314 finds that the two signatures do not match, then block 316 denies the resource. In this case, the signature verifier 222 instructs the container orchestration engine 210 to deny the request to install the resource. If the two signatures do match, then block 318 causes the signature verifier 222 to instruct the container orchestration engine 210 to install the resource.

Figure 4:
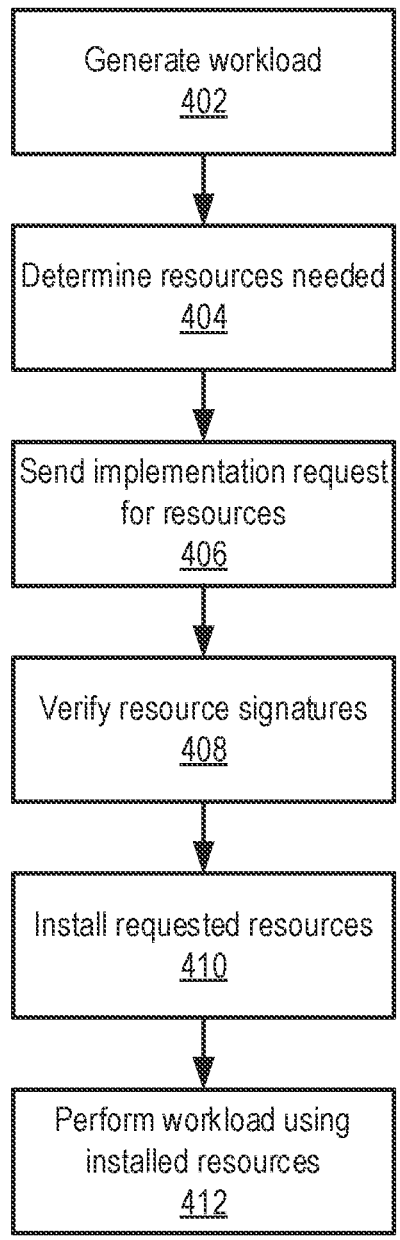
FIG. 4 is a block/flow diagram of a method for installing and using requested resources in a PaaS system that includes signature verification, in accordance with an embodiment of the present invention.

Referring now to FIG. 4, a method for performing a task using a PaaS system, such as the system 100 described above. Block 402 generates a workload. For example, the workload may include any appropriate software to perform any purpose, such as processing financial transactions or performing statistical computations on large datasets. Block 404 determines what resources will be needed to perform the workload. For example, block 404 may determine how many instantiations may be needed, what operating systems and supporting software may be used, and what containers may be used. Block 406 sends the request for these resources to the manager system 104.

Block 408 verifies the resource signatures as described above. If the verification is successful, block 410 installs the requested resources, and block 412 performs the workload using the installed resources. In the event that block 408 fails to verify the resource signatures, then a user 102 may go back to audit their resource requests, to identify and address discrepancies. A failure to verify the signature may indicate an attempt to tamper with the resources by an attacker.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 5:
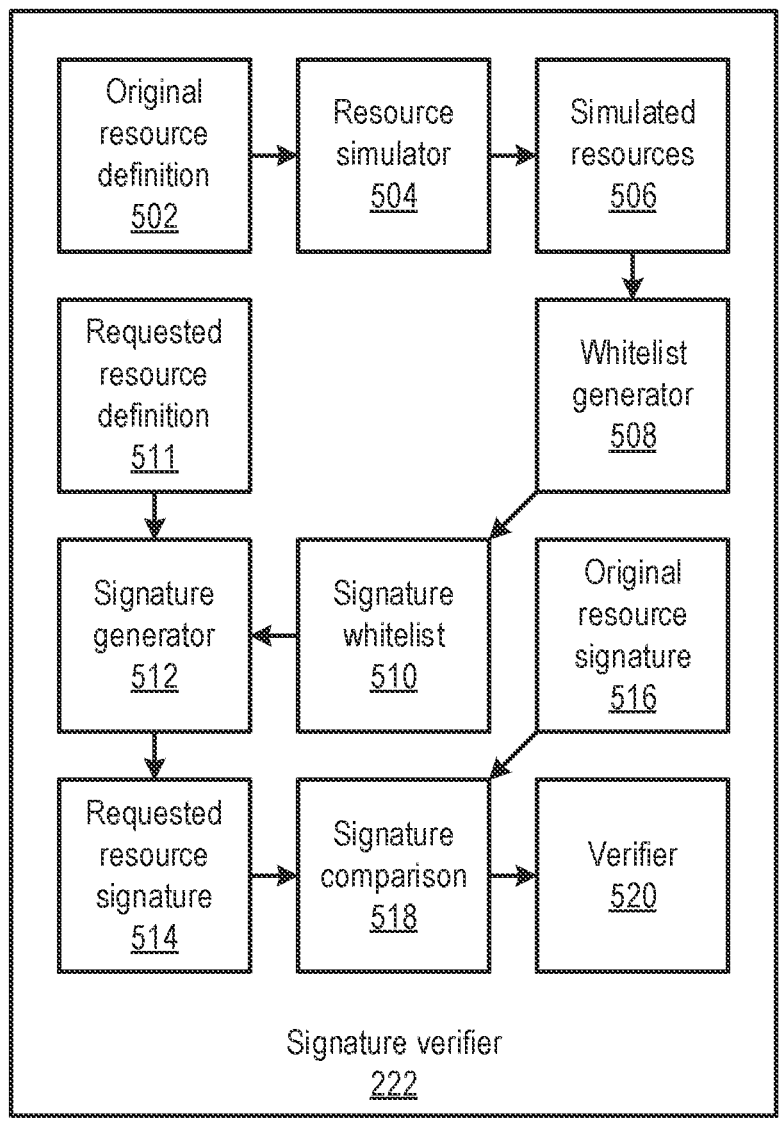
FIG. 5 is a block diagram of a signature verification system that simulates an original resource definition to identify a whitelist of changes that occur during handling of the resource definition, and that verifies a received resource definition using that whitelist, in accordance with an embodiment of the present invention.

Referring now to FIG. 5, additional detail on the signature verifier 222 is shown. It should be understood that the signature verifier 222 may be implemented as part of the processing node 106 as described above, may be implemented as part of the manager system 104, may be an independent system running on separate hardware, or may be implemented in any other appropriate fashion. In the event that the signature verifier 222 is running on separate hardware, then it may include a hardware processor, a memory, and a communications interface (not shown). If the signature verifier 222 is collocated with the manager system 104 or a processing node 106, then it may share the hardware resources of those systems.

The signature verifier 222 receives and stores a copy of the original resource definition 502. This original resource definition 502 may differ from the original resource definition, due to discrepancies introduced by the PaaS system, for example by KUBERNETES software. A resource simulator 504 (e.g., the KUBERNETES "DryRun" function) runs one or more simulations of the original resource definition 502 to generate simulated resources 506. A whitelist generator 508 analyzes the simulated resources 506 to identify parts of the definition that change when it is handled by the PaaS system. The whitelist generator 508 thereby generates a signature whitelist 510 that may identify lines and fields in the resource definition that change during normal operation.

The requested resource definition 511 is processed by a signature generator 512, for example using the same function as was used to generate the original resource signature 516, using the signature whitelist 510 to omit portions of the requested resource definition 511 that change during normal operation. The signature generator 512 thereby produces a requested resource signature 514. The requested resource signature 514 is compared with the original resource signature 516 at signature comparison 518. A verifier 520 makes a determination, based on any discrepancies between the two signatures, as to whether the requested resource definition is legitimate and may be installed.

Figure 6:
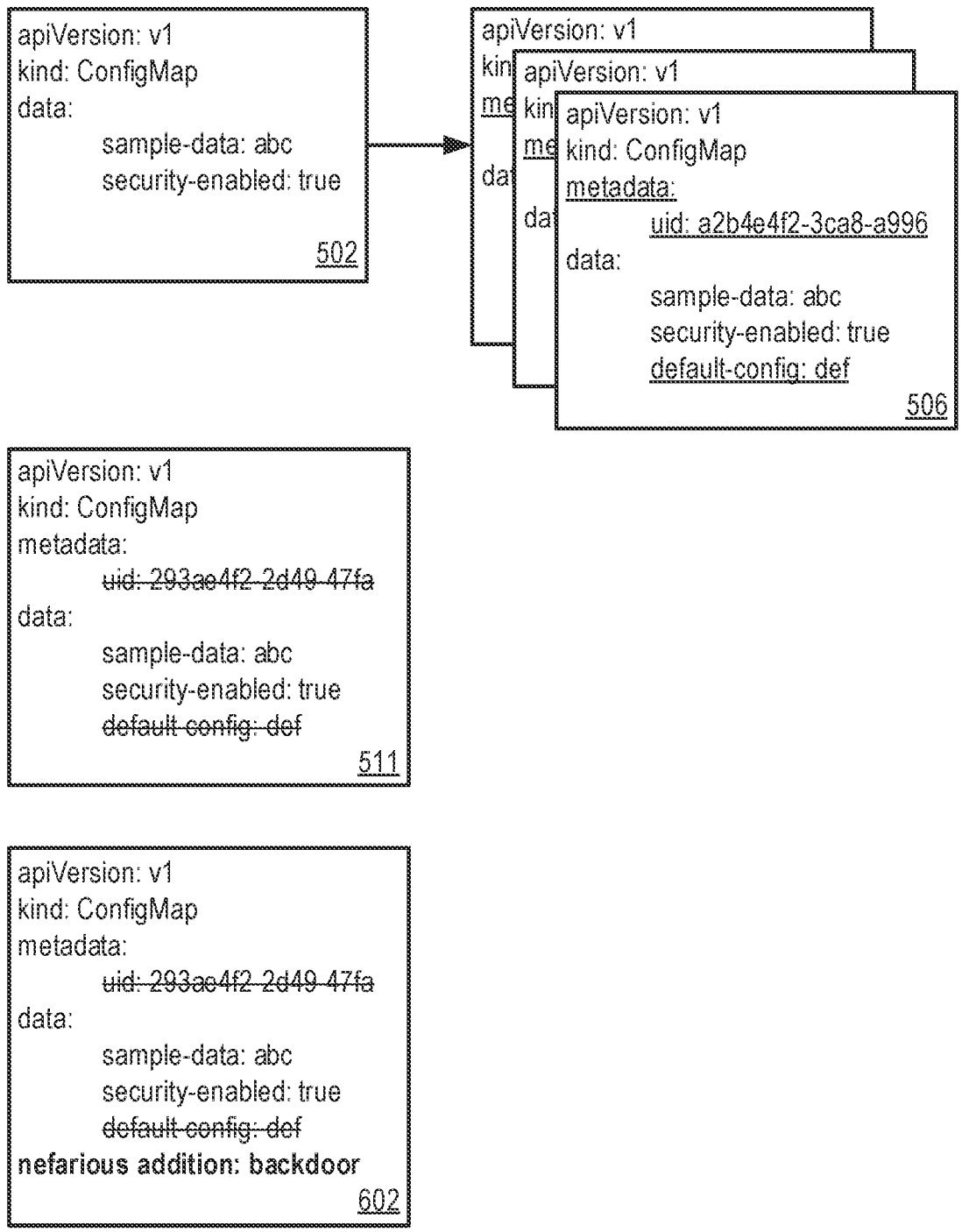
FIG. 6 is a diagram that illustrates different kinds of resource definitions and the changes that may occur within them, in accordance with an embodiment of the present invention.

Referring now to FIG. 6, a comparison of various resource definitions is shown. The original resource definition is shown as block 502, which shows the information that specifies the resource. Blocks 506 shows a set of simulated resource definitions that are based on the original resource definition 502. The portions that change during the simulation are shown as underlined; these additions are introduced by the PaaS system for its own purposes, and do not generally affect the functioning of the ultimate resource installation.

A requested resource definition is shown in block 511. During verification, those additions shown in the simulated definitions 506 are located within the requested resource definition 511 and are omitted during signature verification. Excluding these additions, the remaining contents of the requested resource definition 511 match the contents of the original resource definition 502, so the verification succeeds.

In contrast, a malicious resource definition 602 is shown. As with the requested resource definition 511, any identified changeable lines are omitted during signature verification. However, another line has been introduced by a malicious actor, shown in bold. If this malicious resource definition 602 is submitted for signature verification, the mismatch that the introduced line causes will cause verification to fail, preventing installation of the malicious resource.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
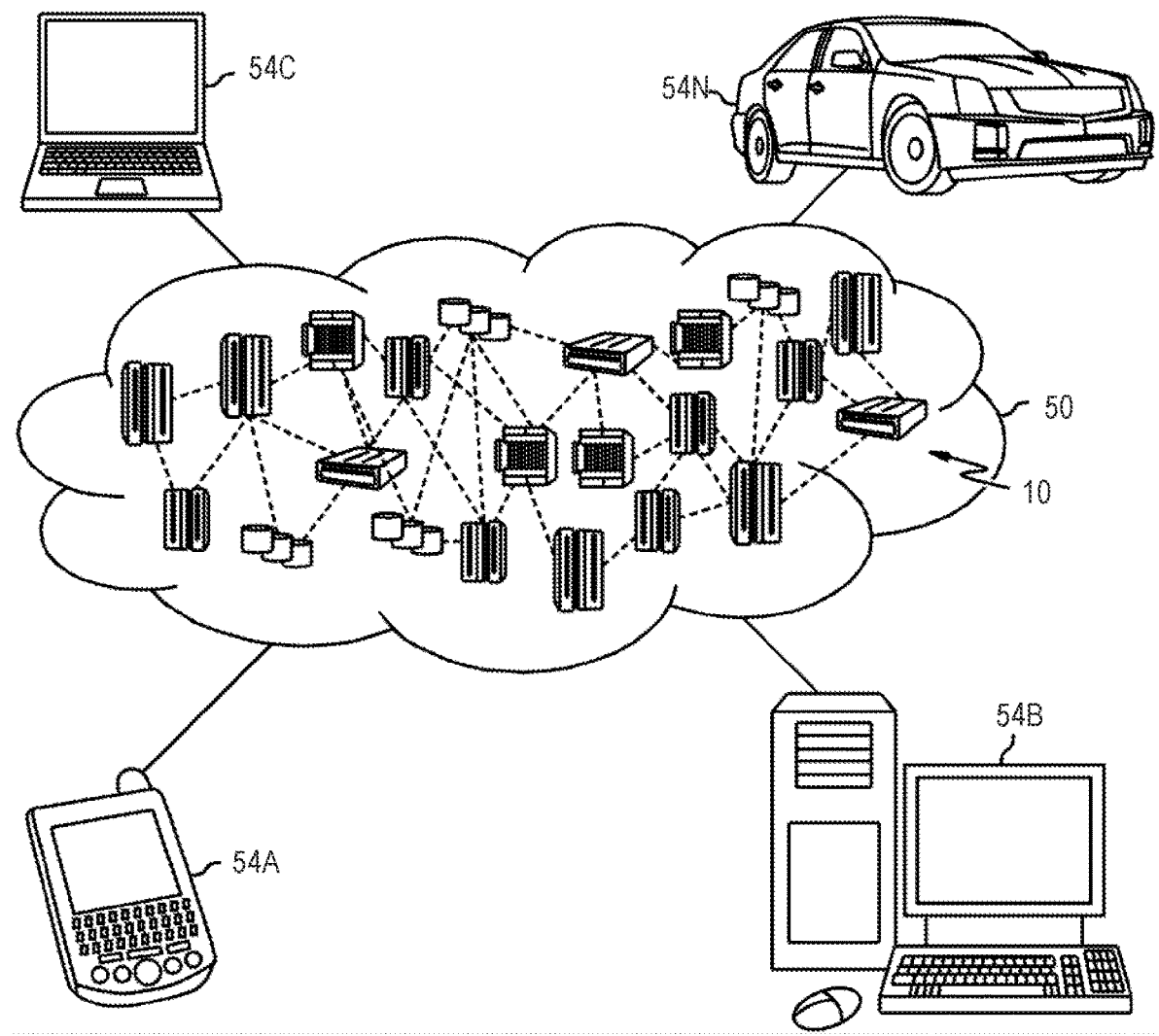
FIG. 7 is a diagram of a cloud computing environment according to the present principles.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
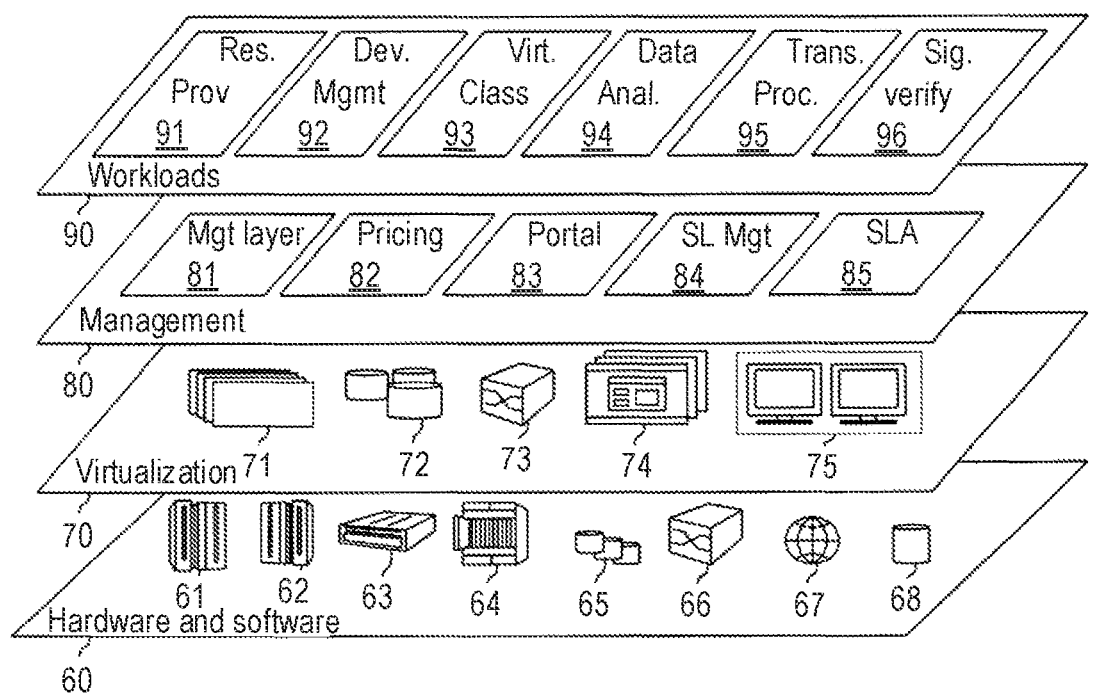
FIG. 8 is a diagram of abstraction model layers according to the present principles.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and signature verification 96.

Having described preferred embodiments of cluster resource signature verification (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for verifying a resource definition, comprising:
   simulating an original resource definition, defined for a container manager, using a DryRun function of the container manager to generate a simulated resource definition according a change that is made to the original resource definition by the container manager;
   identifying the change using a comparison of the original resource to the simulated resource definition;
   generating a signature of a received resource definition, omitting portions of the received resource definition that correspond to the at least one identified change;
   comparing the signature of the received resource definition to a signature of the original resource definition to find a match and to verify the received resource definition; and
   implementing the received resource definition, responsive to finding the match.

2. The method of claim 1, wherein simulating the original resource definition includes running a simulation of the original resource definition at least twice.

3. The method of claim 1, wherein generating the signature of the received resource definition includes removing the portions of the received resource definition that correspond to the at least one identified change from the received resource definition before generating a signature from remaining portions.

4. The method of claim 1, farther comprising receiving the received resource definition from a user.

5. The method of claim 4, further comprising generating the signature of the original resource definition, wherein generating the signature of the original resource definition is performed before receiving the received resource definition.

6. The method of claim 1, wherein the original resource definition and the received resource definition are text-based YAML files.

7. The method of claim 1, wherein implementing the received resource definition includes installing a corresponding resource on a local processing node.

8. A computer program product for verifying a resource definition, the computer program product comprising a computer readable storage medium having program instructions embodied therewith, the program instructions executable by a hardware processor to cause the hardware processor to:
   simulate an original resource definition, defined for a container manager, using a DryRun function of the container manager to generate a simulated resource definition according a change that is made to the original resource definition by the container manager;
   identify the change using a comparison of the original resource to the simulated resource definition;
   generate a signature of a received resource definition, omitting portions of the received resource definition that correspond to the at least one identified change;
   compare the signature of the received resource definition to a signature of the original resource definition to find a match and to verify the received resource definition; and
   implement the received resource definition, responsive to finding the match.

9. The computer program product of claim 8, wherein simulating the original resource definition includes running a simulation of the original resource definition at least twice.

10. The computer program product of claim 8, wherein generating the signature of the received resource definition includes removing the portions of the received resource definition that correspond to the at least One identified change from the received resource definition before generating a signature from remaining portions.

11. The computer program product of claim 8, wherein the program instructions are further executable by a hardware processor to cause the hardware processor to receive the received resource definition from a user.

12. The computer program product of claim 11, wherein the program instructions are further executable by a hardware processor to cause the hardware processor to generate the signature of the original resource definition, wherein generating the signature of the original resource definition is performed before receiving the received resource definition.

13. The computer program product of claim 8, wherein implementing the received resource definition includes installing a corresponding resource on a local processing node.

14. A system for verifying a resource definition, comprising:
   a hardware processor; and
   a memory that stores computer program code, which, when executed by the hardware processor, causes the hardware processor to:
     simulate an original resource definition, defined for a container manager, using a DryRun function of the container manager to generate a simulated resource definition according a change that is made to the original resource definition by the container manager;
     identify the change using a comparison of the original resource to the simulated resource definition;
     generate a signature of a received resource definition, omitting portions of the received resource definition that correspond to the at least one identified change;
     compare the signature of the received resource definition to a signature of the original resource definition to find a match and to verify the received resource definition; and
   implement the received resource definition, responsive to finding the match.

* * * * *